Dec. 23, 1958   R. W. JOHNSON ET AL   2,866,192
MISS DISTANCE INDICATOR
Filed March 29, 1955   3 Sheets-Sheet 1
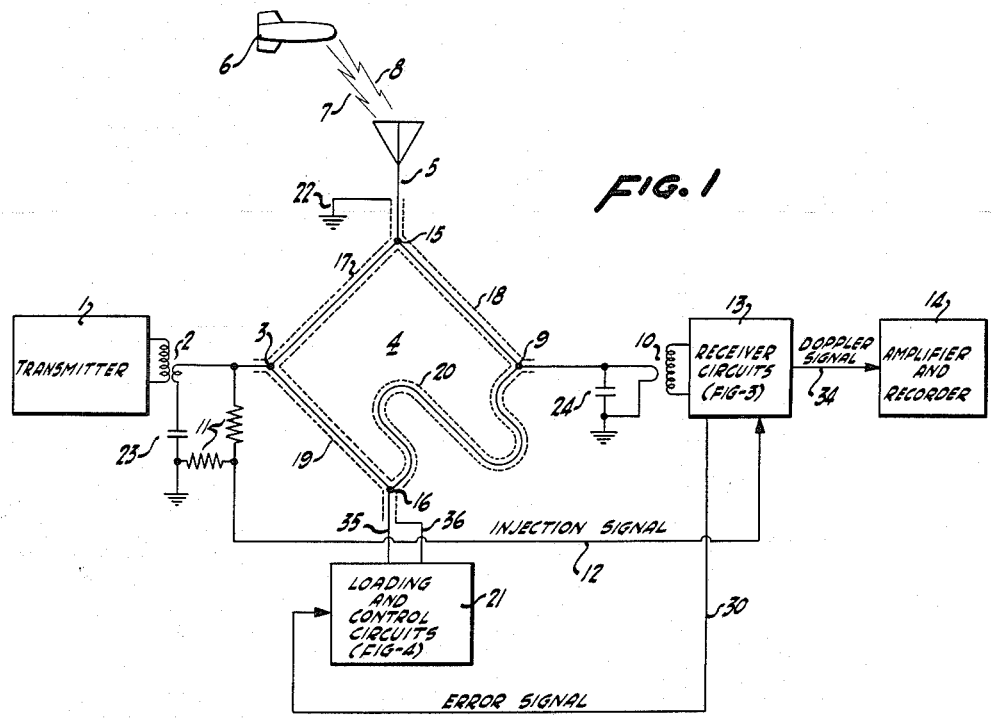
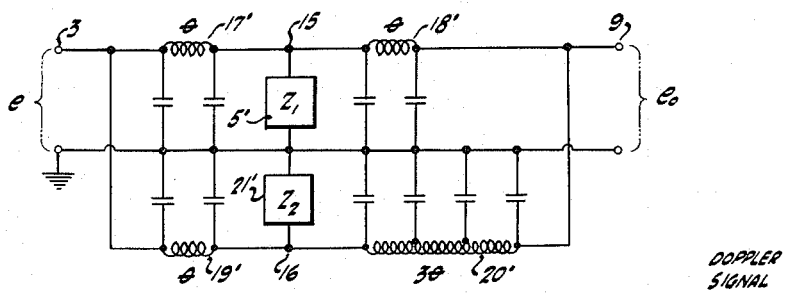
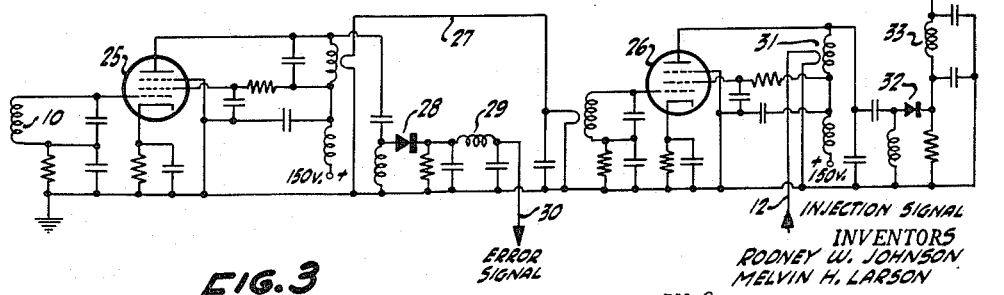
INVENTORS
RODNEY W. JOHNSON
MELVIN H. LARSON
BY Lippincott and Smith
ATTORNEYS Dec. 23, 1958

R. W. JOHNSON ET AL 2,866,192

MISS DISTANCE INDICATOR

Filed March 29, 1955

INVENTORS
RODNEY W. JOHNSON
MELVIN H. LARSON

BY Lippincott and Smith

ATTORNEYS

Dec. 23, 1958 R. W. JOHNSON ET AL 2,866,192
MISS DISTANCE INDICATOR
Filed March 29, 1955 3 Sheets-Sheet 3
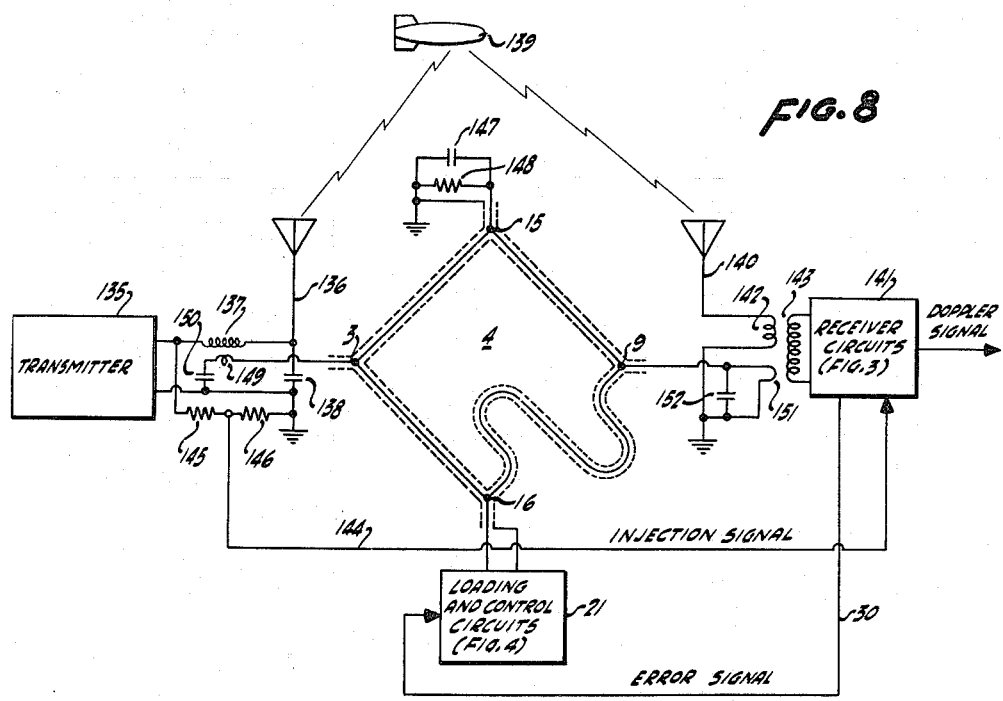
FIG. 8
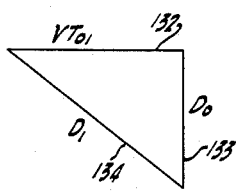
FIG. 7
FIG. 6
INVENTORS
RODNEY W. JOHNSON
MELVIN H. LARSON
BY Lippincott and Smith
ATTORNEYS

United States Patent Office 2,866,192
Patented Dec. 23, 1958

2,866,192

MISS DISTANCE INDICATOR

Rodney Warren Johnson, Pasadena, and Melvin Hadley Larson, Monrovia, Calif., assignors to The Ralph M. Parsons Company, Pasadena, Calif., a corporation of Nevada Application March 29, 1955, Serial No. 497,576

21 Claims. (Cl. 343—12)

This invention relates to Doppler radar systems useful in measuring miss distance between a missile, rocket or projectile and an airborne target, and in particular to novel balancing means for reducing leakage signals between the radar transmitter and the receiver.

The need for measurement of miss distance, or firing error, between a missile, rocket or projectile and an airborne target has existed for many years and has assumed major importance as the development of missiles has progressed to the point of actual testing against aircraft. Accordingly, a principal object of this invention is to provide a miss distance indicator which can be installed on a target aircraft and which will provide data for computing the miss distance of missiles, rockets, or projectiles fired at the aircraft.

Desirable requirements for a miss distance indicator are severe. It should be a passive system—one which requires no additions to the missile. It should be usable for a wide variety of missiles, rockets or projectiles of various sizes, under all conditions of weather and visibility. It should indicate the miss distance of missiles having nearly any direction of approach to the aircraft. It should provide an output signal in electrical form suitable for transmission, processing and assessment by automatic means. Its reliability must be high, and its weight and cost should be reasonably low. Despite much applied research in the field, no previously known miss distance indicator has met these requirements satisfactorily. Accordingly, another object of this invention is to provide a miss distance indicator which adequately meets the above requirements.

In principle a simple Doppler radar system should be useful as a miss distance indicator. The Doppler signals would have a frequency proportional to the radial velocity of a missile relative to the target. Assuming that the direction and velocity of the missile remain constant over short time intervals, and that the missile does miss the target, the Doppler beat frequency is high when the missile is far away from the target, decreases in frequency as the missile approaches and goes through "zero" frequency at the point of miss, and increases in frequency as the missile passes beyond the target. If this Doppler signal can be recorded, it provides sufficient data for computing the magnitude, but not the direction of the miss distance.

In practice, however, Doppler radar systems available heretofore do not adequately meet the requirements for a miss distance indicator. The energy reflected from the missile and received by the receiver is usually less than the transmitted energy by a factor of ten billion to one hundred thousand billion, or 100 to 140 decibels. If leakage signals between the transmitter and receiver are present in amounts greatly exceeding the received signal, then noise on the transmitter signal can completely mask the received signal. In prior art Doppler radar systems, the leakage signal between transmitter and receiver is generally reduced 50 db or more by using separate highly directional transmitting and receiving antennas. In addition, balancing networks may be employed to reduce the leakage signals about another 10 db. However, with balancing systems heretofore available the leakage signal is still much larger than is desirable in a miss distance indicator, and the use of highly directional antennas prevents use of the prior art systems with missiles approaching the target from more than one direction. Antenna scanning systems, in addition to complicating the equipment, would encounter difficulties due to the fact that missiles may travel at supersonic speed, and may miss the target at distances varying from a few feet to hundreds of feet. Accordingly, another object of this invention is to provide improved means for reducing the leakage signal between a transmitter and a receiver without using highly directional antennas.

To best satisfy the omni-directional requirements of a miss distance indicator, to reduce the weight and complexity of the equipment which is to be installed in an aircraft, and to eliminate problems of microphonics between sending and receiving antennas, it is desirable that the miss distance indicator use a single non-directional antenna for both receiving and transmitting. It has often been suggested that a single antenna would be satisfactory in a Doppler radar system if a bridge-like system were used similar to that used in two-way telephone repeaters. In the past, however, such suggestions have generally proven impractical because very slight mechanical changes will spoil a 60 db or better balance between two equal voltages, and therefore such bridge systems have tended to be highly microphonic. Accordingly, still another object of this invention is to provide a sensitive, single-antenna Doppler radar suitable for use as a miss distance indicator.

Another object of this invention is to provide self-adjusting electrical balancing apparatus for balancing out electric signals.

Still another object of this invention is to provide an improved diplexer for simultaneously sending electric signals and receiving other electric signals over a common two-way signaling circuit.

Other objects and advantages will appear as the description proceeds.

Briefly stated, in accordance with one aspect of this invention, the necessary reduction of leakage signals between transmitting and receiving circuits is provided by a self-adjusting balancing circuit which includes a hybrid ring having four terminals connected together in a closed circuit loop by four circuit arms which preferably are lengths of coaxial cable. As an example, three of these circuit arms may be each substantially one-quarter of a wavelength long while the fourth circuit arm is substantially three-quarters of a wavelength long, so that two parallel electrical circuits, which differ in length by one-half wavelength, are provided between two opposite terminals of the hybrid ring which are connected to the sending and receiving circuits respectively. Accordingly, under proper balance conditions hereinafter discussed, portions of the leakage signal transmitted to the receiver over one of the two parallel circuits are in phase opposition to equal portions of the leakage signal transmitted to the receiver over the other of the two parallel circuits. By means of automatic rebalancing apparatus hereinafter described, a sufficiently close balance between these opposed portions of leakage signal can be maintained to reduce the leakage signal by more than 120 db.

The two intermediate terminals of the hybrid ring are connected respectively to two circuit loading devices, one of which may be a common sending and receiving antenna. The impedances of these loading devices affect both the amplitude and the phase of respective portions of the leakage signal so that electrical balancing of the ring can be accomplished by adjusting the impedance of either loading device. To permit automatic and rapid rebalancing, the impedance of one loading device is controlled by resistance tube and reactance tube electronic circuits.

The automatic balancing apparatus includes modulator means cyclically varying the impedance of one loading device about a mean impedance adjustment, so that a small, amplitude-modulated leakage signal is transmitted to the receiving circuit. When this leakage signal is demodulated by a detector, an error signal is provided which has an amplitude related to the amount of unbalance and a phase related to the direction of unbalance of the hybrid ring. By suitable phase comparator means, this error signal controls the mean impedance of one loading device and keeps the hybrid ring substantially in balance.

This invention will be better understood from the following description taken in connection with the accompanying drawings and its scope will be pointed out in the appended claims. In the drawings, Fig. 1 is a schematic diagram, partly in block form, illustrating one embodiment of the invention;

Fig. 2 is an "equivalent circuit" diagram which will be used in explaining operation of the hybrid ring circuit.

Fig. 3 is a circuit diagram of the receiver circuits shown in block form in Fig. 1;

Fig. 6 is a graphical representation of a Doppler signal obtained with the apparatus of Fig. 1;

Fig. 7 is a geometrical diagram which will be used in explaining the calculation of miss distance; and Fig. 8 is a schematic diagram, partly in block form, illustrating another embodiment of the invention.

Figure 4:
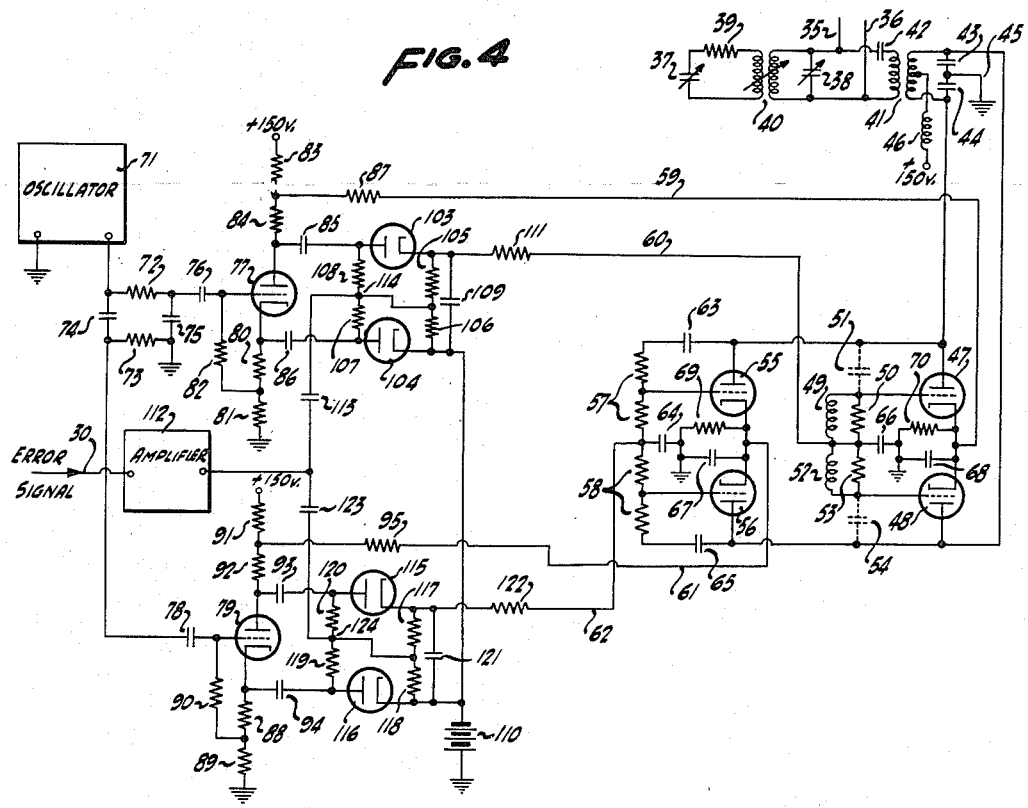
Fig. 4 is a circuit diagram of the loading and control circuits, shown in block form in Fig. 1.

Referring now to the drawings, Fig. 1 illustrates a miss distance indicator which may be installed on a drone airplane toward which missiles, rockets or projectiles are fired. The miss distance indicator provides a Doppler signal record from which the miss distance, or firing error, of the missile can be determined. The apparatus includes a radio transmitter 1 which provides a continuous wave electric signal which is preferably in the very high frequency range—for example, at a frequency of 132.01 megacycles per second.

This signal travels from the transmitter through a sending circuit including a coupling transformer 2 into the input terminal 3 of a hybrid ring diplexer indicated generally at 4. From the diplexer, the transmitted signal travels to an antenna 5 from which it is radiated in a broad, preferably omni-directional, pattern. A small portion of the transmitted signal is reflected from missile 6 back to antenna 5, as is indicated in the drawing by lines 7 and 8. Antenna 5 is both the sending and the receiving antenna, and the antenna with its connections is part of a two-way signaling circuit.

The received signal is very much smaller than the transmitted signal, and generally the two signals have slightly different frequencies because of a Doppler shift resulting from motion of missile 6 relative to antenna 5. The received signal passes through diplexer 4 and its output terminal 9 to receiving circuits including a coupling transformer 10. An injection signal having the same frequency as the transmitted signal is provided by a voltage divider 11 connected to the signal sending circuits. The injection signal is transmitted by connection 12 to receiver circuits 13 where it is mixed with received signals to provide beat-frequency Doppler signals. The electrical Doppler signals may be amplified and recorded on a paper chart by amplifier and recorder 14, which can be a conventional strip-chart recording apparatus including electronic amplifiers for added sensitivity. The Doppler signals are usually in the low audio-frequency range, and a recorder usable at frequencies up to 600 cycles per second is generally satisfactory. Since the Doppler signals may have a wide range of amplitudes, it is desirable that the recorder audio-frequency amplifiers have automatic gain control or scale compression provisions.

Alternatively, instead of placing the recorder 14 on the drone airplane, the electrical Doppler signal may be telemetered by conventional means to a ground station and recorded there. It is generally desirable to do this so that data will be available more quickly, and will not be lost if the drone plane is destroyed. In addition to, or in place of, recording the Doppler signal on a paper chart, the electrical Doppler signal may be fed into automatic or semi-automatic data processing equipment, a description of which is not required for an understanding of the present invention.

In a typical case, the received signal may be weaker than the transmitted signal by a factor of one trillion or more. If the leakage signal between the transmitter and the receiver is much larger than the received signal, the received signal may be completely obscured by transmitter noise and no useful data will be obtained. Consequently, it is necessary to reduce the leakage signal to an extremely small value. This is accomplished by means of a balancing circuit which will now be described.

Diplexer 4 is a hybrid ring having four terminals, 3, 9, 15 and 16. These four terminals are connected in a closed loop circuit by four circuit arms 17, 18, 19 and 20. One pair of opposite terminals, 3 and 9, are the diplexer input and output terminals, respectively, which are connected to the sending and receiving circuits as hereinbefore explained. The other pair of opposite terminals, 15 and 16, are intermediate terminals to which two circuit loading devices are connected. One of these circuit loading devices is antenna 5, the other circuit loading device is a portion of loading and control circuits 21. The four circuit arms 17, 18, 19 and 20 each consist of a length of transmission line, preferably a coaxial cable. In a preferred embodiment, three of the arms 17, 18 and 19 are each one-quarter of a wavelength long, and the fourth arm 20 is three-quarters of a wavelength long. It will be noted that input terminal 3 is connected by arms 17 and 19 to each of the intermediate terminals 15 and 16, and that output terminal 9 is connected by arms 18 and 20 to each of the intermediate terminals 15 and 16. The outer conductors of the four coaxial cables which make up the hybrid ring are all connected together and are preferably connected to ground as indicated at 22. If desired, input and output terminals 3 and 9 may be interchanged—that is, the sending circuit may be connected to terminal 9 and the receiving circuit to terminal 3—without altering the principle of operation of the hybrid ring. Similarly, antenna 5 and loading circuits 21 may be interchanged—that is, the antenna may be connected to terminal 16 and the loading and control circuits may be connected to terminal 15—without altering the principle of operation. In other words, any one of the four circuit arms may be made the three-quarter wavelength arm. As is more fully explained hereinafter, the four circuit arms may have lengths other than one-quarter and three-quarters of a wavelength.

Assume now that transmission lines 17, 18 and 19 are each precisely one-quarter of a wavelength long, that transmission line 20 is precisely three-quarters of a wavelength long, and that the impedance of antenna 5 as seen from terminal 15 is identical to the impedance of loading circuits 21 as seen from terminal 16.

Also assume that lines 17, 18, 19 and 20 are lossless, and have no substantial effect upon the signal except to shift the phase of the signal by exactly 90° for each quarter wavelength of transmission line through which the signal passes. Under these conditions, it is evident that a signal from the transmitter applied to terminal 3 produces equal voltages at terminals 15 and 16, but produces no voltage at all at terminal 9, since the signal transmitted to terminal 9 through circuit arms 17 and 18 is exactly balanced by an equal signal of opposite phase transmitted to terminal 9 through circuit arms 19 and 20. Accordingly, under these ideal conditions, one-half of the input signal is transmitted to antenna 5, one-half of the input signal is dissipated in loading circuit 21, and there is no leakage signal whatever to output terminal 9. On the other hand, when a received signal from the antenna is applied to terminal 15, any signal transmitted to terminal 9 through circuit arms 17, 19 and 20 is in phase with the signal transmitted directly to terminal 9 through circuit arm 18, and substantially one-half of the received signal reaches the receiver circuits. Although the diplexer system described produces a 6 db power loss in the signal, this is of small importance in a miss distance indicator compared to the advantages accruing from the use of a single antenna and from the practically complete balancing out of leakage signals.

To effect better coupling to the transmitter and receiver circuits, a capacitor 23 is connected as shown in series with the secondary of coupling transformer 2, and a capacitor 24 is connected in parallel with the primary of coupling transformer 10. The secondary of transformer 2 and capacitor 23 form a series-resonant circuit so that the sending circuits present a low impedance to terminal 3, whereas the primary of transformer 10 and capacitor 24 form a parallel resonant circuit so that the receiving circuits present a relatively high impedance to terminal 9.

For a better understanding of the hybrid-ring circuit operation, reference is now made to Fig. 2 which shows an equivalent circuit in which the transmission lines 17, 18, 19 and 20 have been replaced by pi-section filters 17', 18', 19' and 20', respectively, having electrical characteristics similar to those of the transmission lines. Lines 17, 18 and 19, and hence the equivalent filters 17', 18' and 19', are each represented as having an electrical length $\theta$, which means that any electric signal transmitted by these lines is shifted in phase by an amount $\theta$ which may or may not be equal to 90°. Line 20, and hence filter 20' has an electrical length $3\theta$. Antenna 5 is represented in Fig. 2 by an impedance element 5' having a complex impedance $Z_1$ which is identical to the antenna impedance as seen from terminal 15, and loading circuits 21 are represented in Fig. 2 by an impedance element 21' having a complex impedance $Z_2$ which is identical to the impedance of the loading circuits 21 as seen from terminal 16. The signal applied to terminal 3 by the transmitter is represented by the symbol $e$, and the leakage signal appearing at terminal 9 is represented by the symbol $e_0$. The complex impedances $Z_1$ and $Z_2$ may be represented by complex numbers in a conventional manner as follows:

(Equation 1)
$$\frac{1}{Z_1} = \frac{1}{\alpha_1 Z_0} + \frac{1}{j\beta_1 Z_0}$$

(Equation 2)
$$\frac{1}{Z_2} = \frac{1}{\alpha_2 Z_0} + \frac{1}{j\beta_2 Z_0}$$

To determine the null balance conditions for zero leakage signal, a mathematical circuit analysis of the equivalent circuit may be used to find the conditions under which $e_0 = 0$. In the special case under consideration, where three of the transmission lines have equal electrical lengths and the fourth line has an electrical length three times that of any one of the other lines, it is found that $e_0 = 0$ when the following equations are satisfied simultaneously:

(Equation 3)
$$\frac{\sin \theta}{\alpha_1} + \frac{\sin 3\theta}{\alpha_2} = 0$$

(Equation 4)
$$(2 \cos \theta)(1 + 2 \cos 2\theta) + \frac{\sin \theta}{\beta_1} + \frac{\sin 3\theta}{\beta_2} = 0$$

Where $$\theta = \frac{\pi}{2}$$

corresponding to transmission lines one-quarter of a wavelength long, Equations 3 and 4 simplify to (Equation 5)
$$\alpha_1 = \alpha_2$$

(Equation 6)
$$\beta_1 = \beta_2$$

Thus, where transmission lines 17, 18 and 19 are precisely one-quarter of a wavelength long, and transmission line 20 is precisely three-quarters of a wavelength long, the additional condition for balance of the hybrid ring is that impedance $Z_1$ should be identical to $Z_2$, which was evident from the preceding simplified explanation of the circuit. However, Equations 3 and 4 show that the circuit can be balanced to completely cancel out the error signal even though the value of $\theta$ is substantially different from $\pi/2$, but in this case impedances $Z_1$ and $Z_2$ will not be identical. This consideration is important, because in practice the transmission lines cannot be kept precisely at the desired lengths. Temperature changes and other factors cause the lengths of the lines to change from time to time, which would upset the balance of the hybrid ring and permit intolerably large leakage signals to reach the receiver if such changes could not be continuously balanced out. Equations 3 and 4 show that such changes can be balanced out, if provision is made for continuously adjusting both the resistance and the reactance of loading circuits 21. Changes in antenna impedance can also be balanced out in the same way, and to a considerable extent even leakage signals through paths external to the balancing circuit can be cancelled out by compensating unbalance of the balancing circuit.

A more general circuit analysis shows that a null balance can be obtained with lines 17, 18, 19 and 20 of any four arbitrary lengths, none of which are necessarily equal to any of the others, provided the complex values of $Z_1$ and $Z_2$ are appropriately related. However, some combinations of line lengths would require circuit loading devices having impedance values which it is inconvenient or impossible to provide with practical circuit elements. For example, it is generally desirable that the loading-device resistances $\alpha_1$ and $\alpha_2$ have positive values to avoid circuit complications, and possible difficulties with undesired oscillations, which the use of negative-resistance circuit elements would entail. If the electrical length of line 17 is represented by $\theta_1$, that of line 18 by $\theta_2$, that of line 19 by $\theta_3$, and that of line 20 by $\theta_4$, then a balance condition is:

(Equation 3A)
$$\frac{\sin \theta_1 \sin \theta_2}{\alpha_1} + \frac{\sin \theta_3 \sin \theta_4}{\alpha_2} = 0$$

From this Equation 3A, it is evident that the loading device resistances $\alpha_1$ and $\alpha_2$ can both be positive for any values of $\theta_1$, $\theta_2$, $\theta_3$ and $\theta_4$ for which the product of the sines of the four phase angles has a negative value. In particular, this condition is satisfied, and lines of small, convenient lengths are provided, when three of the lines have electrical lengths smaller than one-half wavelength and the fourth line has an electrical length larger than one-half wavelength and smaller than one wavelength. A preferred condition occurs when three of the lines are one-quarter wavelength long and the fourth line is three-quarters wavelengths long, or $$\theta_1 = \theta_2 = \theta_3 = 90° \text{ and } \theta_4 = 270°$$

However, other line lengths may be used successfully.

For example, if $\theta_1=80°$, $\theta_2=70°$, $\theta_3=100°$ and $\theta_4=250°$, then a null balance can be obtained with loading devices having equal positive resistance values, $\alpha_1=\alpha_2$, and reactance values, generally unequal, which can readily be obtained with practical circuit elements.

For automatic rebalancing purposes, the value of impedance $Z_2$ is cyclically varied by a small amount at an audio-frequency rate, about a mean impedance value which provides substantially a null balance. Consequently, a small amplitude leakage signal is transmitted to the receiver circuits, but the magnitude of this leakage signal is controlled to keep it within the small limits set by the requirements of the system. By means hereinafter described, the leakage signal is demodulated to provide an error signal which controls the mean value of impedance $Z_2$ to maintain automatically and continuously an almost perfect null balance of the system.

Reference is now made to Fig. 3, which shows receiver circuits 13 in more detail. Received signals from the secondary of coupling transformer 10 are amplified by two conventional radio frequency vacuum tube amplifier stages 25 and 26 connected in tandem by a link circuit 27. In addition to the desired received signal, stages 25 and 26 also transmit and amplify the very small, amplitude-modulated leakage signal which passes through the hybrid ring to the receiver circuits. A portion of the amplified signal from stage 25 is demodulated by a detector consisting of a half wave rectifier 28 and a low pass filer 29. The chief purpose of this detector is to demodulate the leakage signal and supply an error signal to lead 30 which continuously rebalances the loading circuits in a manner hereinafter explained. Although any modulation of the received signal will also appear in lead 30 as noise, it has been found in practice that the error signal supplied to lead 30 is a sufficiently faithful reproduction of the leakage signal modulation envelope for control purposes.

At the output of stage 26 a loosely coupled modulation transformer 31 mixes the amplified received signal with an injection signal brought in from the transmitter through lead 12. The mixed signals proceed to a detector consisting of a half-wave rectifier 32 and a low pass filter 33, which provides a beat frequency Doppler signal through lead 34 to the amplifier and recorder, telemeter, or other end device for recording, telemetering, analyzing or otherwise processing the Doppler signal.

It will be noted that the leakage signal has the same frequency as the transmitted signal, and in theory the leakage signal can be used as the heterodyne signal which, when mixed with the received signal, produces the beat-frequency Doppler signal. When this is done however, unavoidable variations in the amplitude of the leakage signal, and in the present apparatus the deliberate modulation of the leakage signal, make it difficult to keep the leakage signal at a proper amplitude for maximum sensitivity of the equipment. According to the present invention, it is preferred that the leakage signal be kept as small as possible, and that an injection signal, which can be kept relatively constant in amplitude, is transmitted by a direct circuit connection from the transmitter or sending circuits to the receiver.

Refer now to Fig. 4, which shows in more detail the loading and control circuits 21. The loading circuits are connected or coupled to leads 35 and 36 which are in turn connected to terminal 16 and the grounded outer conductors of hybrid ring 4, respectively. Manually controlled loading circuits include adjustable capacitors 37 and 38, a resistor 39 and a coupling transformer 40 having variable mutual inductance. These manually controlled circuits permit a first approximate adjustment of reactance and resistance, so that the best operating range is obtained for the resistance tube and reactance tube automatic adjustment circuits which will now be described.

Coupling transformer 41 preferably has a capacitor 42 in series with its primary and a pair of capacitors 43 and 44 connected in series across its secondary, as shown. These capacitors provide better impedance matches with associated circuits, and the connection between capacitors 43 and 44 is grounded at 45 so that the secondary of transformer 41 is balanced with respect to ground. Positive plate voltage for the resistance and reactance tubes is supplied to a center tap on the secondary of transformer 41 through a choke 46 connected to the usual D. C. power supply (not shown).

The reactance tube circuit includes two vacuum tubes 47 and 48, each having a plate, a control grid and a cathode, connected in a push-pull arrangement across the secondary of transformer 41. A phase-shifting network, such as inductor 49, resistor 50 and capacitor 51, applies between the control grid and the cathode of tube 47 a voltage in phase quadrature to the alternating voltage between its plate and its cathode supplied through transformer 41. Similarly, another phase-shifting network, such as inductor 52, resistor 53 and capacitor 54, applies between the control grid and the cathode of tube 48 a voltage in phase quadrature to the alternating voltage between its plate and its cathode. Capacitors 51 and 54 are shown in the drawing by broken lines, since in actual practice these capacitors may be respective interelectrode capacitances of vacuum tubes 47 and 48. Since the control grids of vacuum tubes 47 and 48 are supplied with the potentials in phase quadrature to their plate potentials, these tubes supply reactance to the circuit across the secondary of transformer 41, which is coupled by the transformer into the circuit between leads 35 and 36. The amount of this reactance is controlled by bias voltages applied between the control grids and the cathodes of tubes 47 and 48 in a manner hereinafter described.

The resistance tube circuits comprise two vacuum tubes 55 and 56 each having a plate, a control grid and a cathode. Tubes 55 and 56 are connected as shown in a push-pull arrangement across the secondary of transformer 41, so that the resistance provided by these two tubes is coupled by the transformer into the circuit between leads 35 and 36. A voltage divider 57 applies between the control grid and the cathode of tube 55 a voltage in phase with its plate-to-cathode voltage. A similar voltage divider 58 applies between the control grid and the cathode of tube 56 a voltage in phase with the voltage between its plate and its cathode, so that tubes 55 and 56 provide a circuit resistance the value of which depends upon a control or bias voltage applied between the control grids and the cathodes of tubes 55 and 56 in a manner hereinafter explained. Consequently, the control or bias voltages supplied respectively to the reactance tubes and to the resistance tubes control the resistance and the reactance which loading circuits 21 provide between leads 35 and 36.

The control or bias voltage supplied to reactance tubes 47 and 48 consists of two parts. A first part of the reactance tube control voltage, having a cyclically varying or alternating component, is supplied through lead 59 which is connected to the cathodes of tubes 47 and 48. A second part of the reactance tube control voltage, an adjustable direct voltage, is supplied through lead 60 which is connected through inductors 49 and 52, as shown, to the control grids of tubes 47 and 48. The net bias voltage of tubes 47 and 48 is the algebraic sum of the two voltages supplied through leads 59 and 60. Similarly, the control or bias voltage for the resistance tubes 55 and 56 consists of a first part, having a cyclically varying or alternating component, supplied through lead 61 connected to the cathodes of tubes 55 and 56, and a second part, an adjustable direct voltage, supplied through lead 62 and portions of voltage dividers 57 and 58 to the control grids of tubes 55 and 56. Accordingly, the net bias voltage for tubes 55 and 56 is the algebraic sum of the two voltages supplied through leads 61 and 62. Capacitors 63 and 64, 65 and 66 are D. C. blocking capacitors which complete necessary A. C. feedback circuits for vacuum tubes 47, 48, 55 and 56, but isolate the control grids of these vacuum tubes from direct voltages other than the control voltages supplied through leads 60 and 62. Capacitors 67 and 68 are the conventional A. C. bypass capacitors connected in parallel with cathode resistors 69 and 70.

A balance modulator for cyclically varying the impedance of the loading circuits includes an oscillator 71 which supplies an audio-frequency electric signal having, for example, a frequency of 3000 cycles per second. It should be noted that this modulation frequency is well outside the zero to 600 cycle per second frequency range of the Doppler signal, so that the possibility of interference between the modulation frequency and its harmonics and the desired Doppler signals is relatively small. The audio-frequency signals from oscillator 71 are applied to a phase-splitting network consisting of resistors 72 and 73 and capacitors 74 and 75 connected as shown in the drawing. This phase-splitting network provides two audio-frequency signals in phase quadrature, one of which is transmitted through capacitor 76 to the control grid of a vacuum tube 77, and the other of which is transmitted through capacitor 78 to the control grid of a vacuum tube 79.

Vacuum tube 77 is connected in circuit with cathode resistors 80 and 81, grid leak resistor 82 and plate load resistors 83 and 84, as shown, to provide a balanced push-pull audio-frequency output signal through coupling capacitors 85 and 86. Lead 59 is connected through a resistor 87 to a circuit junction between plate load resistors 83 and 84, so that a 3000 cycle alternating signal is transmitted through lead 59 to the cathodes of vacuum tubes 47 and 48. This alternating signal is a part of the control or bias voltage supplied to reactance tubes 47 and 48, and it causes the reactance of loading circuits 21 to vary cyclically about a mean reactance value.

Similarly, vacuum tube 79 is connected in circuit with cathode resistors 88 and 89, grid leak resistor 90 and plate load resistors 91 and 92, as shown, to provide a balanced push-pull audio-frequency output signal through coupling capacitors 93 and 94. Lead 61 is connected through a resistor 95 to the circuit junction between plate load resistors 91 and 92, so that an audio-frequency part of a control or bias signal is supplied to the cathode of resistance tubes 55 and 56, whereby the resistance of loading circuits 21 is varied cyclically about a mean resistance value. Since the control grids of vacuum tubes 77 and 79 are supplied with audio-frequency voltages which are in phase quadrature, the alternating part of the control voltage supplied through lead 59 to the reactance tubes is in phase quadrature with the alternating part of the control voltage supplied through lead 61 to the resistance tubes. Consequently, the cyclic reactance variations are in phase quadrature with the cyclic resistance variations of the loading circuits.

As hereinbefore explained, the cyclic impedance variations of loading circuits 21 amplitude modulate the leakage signal transmitted to receiver circuits 13, and a detector in the receiver circuits demodulates this leakage signal to supply an error signal through lead 30 which is used in controlling the mean impedance values of loading circuits 21. For a better understanding of how this error signal is derived, refer now to Fig. 5 and assume that only the reactance of circuits 21 is varied cyclically, while the resistance of the loading circuits remains constant at the best value for balancing the hybrid ring 4.

Figure 5:
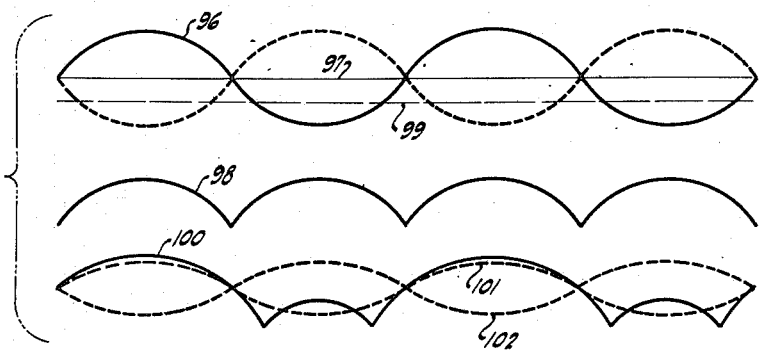
Fig. 5 is a group of curves which will be used in explaining operation of the rebalancing apparatus.

In Fig. 5, let the sine wave curve 96 represent the alternating part of a control voltage applied through lead 59 to the cathodes of reactance tubes. As the cathodes become more positive, conduction of current through the tubes decreases and the effective reactance of tubes 47 and 48 increases, so that sine wave curve 96 also represents the cyclic variations in reactance of the loading circuits 21 about a mean reactance value represented by the straight horizontal line 97. Now assume that line 97 also represents the best reactance for null balance of hybrid ring 4—in other words, assume that the deviation between the mean reactance and the best reactance is zero. Also assume that the resistance of loading circuits 21 is constant at the best resistance for a null balance of the hybrid ring. Under these assumptions, the amplitude of the leakage signal is zero at each point in time where curve 96 crosses line 97 and it has a value greater than zero at every other point. Accordingly, the amplitude of the leakage signal can be represented by curve 98, which also represents the signal supplied to lead 30 by the detector in the receiving circuit which demodulates the leakage signal. It will be noted that curve 98 has half-wave symmetry, and therefore contains only even harmonics of the modulation frequency. Since the phase comparator hereinafter described is nonresponsive to the even harmonics, curve 98 in effect represents a zero error signal which in turn represents zero deviation between the mean reactance of loading circuits 21 and the best reactance for balancing hybrid ring 4.

Now assume that curve 96 again represents the cyclic variations in reactance about a mean reactance represented by line 97, but that the best reactance for balancing the hybrid ring is now represented by broken line 99. In other words, the mean reactance is greater than the best reactance, and the amount of the deviation is represented by the distance between broken lines 97 and 99. Under these assumed conditions, the error signal has zero amplitude at each point in time where curve 96 crosses line 99, and the signal supplied to lead 30 upon demodulation of the error signal is represented by curve 100. It can be noted that curve 100 has a component represented by broken sine wave curve 101 at the fundamental modulation frequency. In the case illustrated, curve 101 is in phase with curve 96. It can easily be shown that curve 101 is reversed in phase, as represented by broken sine wave curve 102, when line 97 is below line 99—that is, when the mean reactance of circuit 21 is less than the best reactance for balancing the hybrid ring. Consequently, the component of the demodulated signal represented by curve 101 has the essential characteristics of an error signal. The amplitude of curve 101 is zero when the deviation between mean reactance and best reactance is zero, and its amplitude increases with increasing deviation between the mean reactance and the best reactance. Furthermore, the phase of the error signal represented by curve 101 reverses with reversals in the direction of deviation.

The effect of cyclic resistance variations can be analyzed in exactly the same way, and the curves shown in Fig. 5 are equally applicable to the resistance analysis, except that all of the curves should be shifted 90° in time since the cyclic variations in resistance are in phase quadrature with the cyclic variations in reactance. When both reactance and resistance are varied cyclically, the modulation frequency error signal applied to lead 30 consists of two components in phase quadrature, one of which represents resistance variations from the best resistance for balancing the hybrid ring, and the other of which represents reactance variations from the best reactance for balancing the hybrid ring.

Again referring to Fig. 4, a phase comparator consists of vacuum tube rectifiers 103 and 104 connected in circuit with resistors 105, 106, 107 and 108, as shown. A bypass capacitor 109 is connected between the cathodes of tubes 103 and 104 to reduce alternating voltages between the two cathodes. The cathode of tube 104 is maintained at a negative potential by biasing means represented in the drawing by battery 110. In practice, other suitable negative bias sources may be used, such as means rectifying a portion of the output from oscillator 71 to provide a negative bias voltage. Audio-frequency voltages of opposite phase are applied through capacitors 85 and 86 to the plates of tubes 103 and 104, so that these two tubes conduct current during alternate half cycles. When no error signal is present, tubes 103 and 104 conduct substantially equal amounts of current, so that the respective voltage drops across resistors 105 and 106 are equal, and the electrical potential of the cathode of tube 103 is the same as that of the cathode of tube 104. Accordingly the potential supplied through resistor 111 and lead 60 to the control grids of reactance tubes 47 and 48 is equal to the negative bias potential supplied by battery 110.

The error signal supplied to lead 30 by the detector in the receiver circuits is amplified by a conventional audio-frequency amplifier 112 and is transmitted through a coupling capacitor 113 to a common circuit junction 114 between resistors 105, 106, 107 and 108. As hereinbefore explained, when the mean reactance of the loading circuit is larger than the best reactance for balancing hybrid ring 4, a modulation-frequency error signal is provided which is in phase with the alternating control voltage applied through lead 59 to the cathodes of the reactance tubes. Accordingly under these conditions, an error signal is applied to circuit junction 114 which is in phase with the voltage supplied through capacitor 85 to the plate of rectifier tube 103. This causes tube 103 to conduct more current than tube 104, so that the voltage drop across resistor 105 is greater than the voltage drop across resistor 106, and the cathode of tube 103 becomes more positive. Consequently the control voltage between the control grids and the cathodes of reactance tubes 47 and 48 becomes more positive, conduction of current by the reactance tubes is increased so that the mean reactance of loading circuits 21 is reduced, and hybrid ring 4 is automatically rebalanced.

Similarly, if the mean reactance of the loading circuit is smaller than the best reactance for balancing the hybrid ring, the error signal supplied to junction 114 is in phase with the voltage transmitted through capacitor 86 to the plate of rectifier tube 104, so that under these conditions tube 104 conducts more current than tube 103, and the potential supplied through lead 60 to the reactance tube control grids becomes more negative and the mean reactance is increased. As was previously stated, even harmonics of the modulation frequency which may be present in the error signal have no substantial effect upon the phase comparator output voltage, since even harmonics have the same effect upon the conduction of both tubes 103 and 104, and accordingly produce no substantial change in the potential of lead 60. Furthermore, the resistance error signal has no substantial effect upon the output voltage of the reactance phase comparator, since the component of error signal due to resistance unbalance is in phase quadrature to the voltages provided through capacitors 85 and 86. Consequently, this quadrature-phase component causes each of the tubes 103 and 104 to conduct more current during a portion of each cycle and less current during other portions of each cycle, so that the net effect of the quadrature phase component of the error signal is substantially zero.

Another phase comparator consists of vacuum tube rectifiers 115 and 116 connected in circuit with four resistors 117, 118, 119 and 120, as shown, and the bypass capacitor 121 connected between the cathodes of tubes 115 and 116. The cathode of tube 116 is connected to negative bias supply 110, and the cathode of tube 115 is connected through resistor 122 and lead 62 to the control grids of resistance tubes 55 and 56. Audio-frequency voltages of opposite phase are supplied to the plates of tubes 115 and 116 through coupling capacitors 93 and 94. Error signals from amplifier 112 are supplied through coupling capacitor 123 to the common circuit junction 124 between resistors 117, 118, 119 and 120. This phase comparator works exactly like the one previously described, except that the audio-frequency voltages supplied through capacitors 93 and 94 are respectively in phase with and in phase opposition to the alternating part of control voltage supplied through lead 61 to the cathode of resistance tubes 55 and 56. Consequently, the phase comparator comprising tubes 115 and 116 responds to the resistance unbalance component of the error signal, and controls the potential of lead 62 to adjust the mean resistance provided by tubes 55 and 56 and to reduce deviations between the mean resistance of the loading circuit and the best resistance for balancing hybrid ring 4.

Although beat-frequency Doppler signals having frequencies lying between zero and 600 cycles per second may appear in lead 30 along with the error signal, these Doppler signals have little if any effect upon the automatic rebalancing apparatus, because the phase comparators are relatively unresponsive to signals having any frequency other than the 3000 cycle per second modulation frequency and its odd harmonics. Also a considerable increase in the ratio of error signal amplitude to Doppler signal amplitude can be effected by designing the circuits of amplifier 112 to provide greatest amplification of signals having frequencies near 3000 cycles per second, with much less amplification, or even attenuation, of signals having different frequencies. On the other hand, the 3000 cycle per second error signal and its harmonics may appear in lead 34 along with the desired Doppler signal. Here also, the mixture of different signals causes little difficulty, since in general the 3000 cycle per second error signal is well above the upper limit of frequencies which the moving element of chart recorders can follow. In this instance, the ratio of Doppler signal to error signal amplitudes is increased by the mixing of an unmodulated injection signal from lead 12 with the output of amplifier stage 26 in the receiver circuits. If desired, the Doppler signal to error signal amplitude ratio can be increased still further by proper design of the amplifier circuits associated with the chart recorder, and by the use of frequency-selective filter circuits which can readily be supplied by persons skilled in the art.

The automatic rebalancing system which has been described provides a much greater reduction of leakage signals between sending and receiving circuits than could be obtained as a practical matter without automatic rebalancing. Ordinary diplexers, such as the microwave "magic-tee," usually attenuate the transmitter signal by a mere 20 to 30 db on the average, instead of about 120 db as is required in the miss distance indicator. With manually balanced diplexers, any change, such as a small change in temperature which produces a minute change in the electrical characteristics of any element of the diplexer, including the antenna impedance, can unbalance the diplexer sufficiently to permit the transmission of leakage signals much larger than the tolerable maximum. But with the automatic rebalancing system, the amplitude modulated leakage signal which is purposely transmitted, is controlled in value and remains always below the leakage signal level which can be tolerated by the miss distance indicator system, and any circuit changes due to temperature variations or other causes, which would otherwise permit larger leakage signals, are promptly and automatically compensated by the automatic rebalancing apparatus which this invention provides.

Alternatively, instead of using two error signal components in phase quadrature to control respectively the resistance and the reactance rebalancing means, two error signals having different frequencies may be employed. For example, the phase splitting network 72, 73, 74, 75 may be omitted, and oscillator 71, operating at 3000 cycles per second, can be connected directly to the control grid of tube 77 through capacitor 76. Another oscillator operating at a different frequency, 5000 cycles per second for example, is then connected to the control grid of tube 79 through capacitor 78. With this alternative arrangement, reactance deviation from best balance conditions produce a 3000 cycle error signal which controls a component of bias voltage supplied to reactance tubes, and resistance deviations produce a 5000 cycle error signal which controls a component of bias voltage supplied to the resistance tubes. However, the embodiment illustrated in the drawings and hereinbefore described, in which the two error signal components have the same frequency and are in phase quadrature, generally produces better results and is preferred.

It should be noted that substantial cancellation of the composite leakage signal by the automatic rebalancing mechanism extends to portions of leakage signal other than those which are transmitted directly through hybrid ring 4. It has been noted that hybrid ring 4 provides two parallel circuits, each of which transmits a portion of a leakage signal between the sending circuits and the receiving circuits. One portion of leakage signal is transmitted through circuit arms 17 and 18, while another portion of leakage signal is transmitted through circuit arms 19 and 20. The rebalancing arrangements which have been described continuously and automatically adjust the impedance between leads 35 and 36 in such a way that the portion of leakage signal transmitted through arms 19 and 20 opposes and cancels out portions of leakage signal transmitted through circuit arms 17 and 18, or through any other circuit path. For example, assume that leakage signal is transmitted from coupling transformer 2 to coupling transformer 10 by means of a small amount of inductive coupling between the two transformers. As far as the receiver and rebalancing circuits are concerned, the addition of another portion of leakage signal through some additional circuit coupling, so long as the additional leakage is relatively small, is no different from a change in the amount or the phase, or both, of the leakage signal passing through arms 17 and 18. Consequently the rebalancing apparatus will operate to reduce the total leakage signal, and in effect the automatic rebalancing arrangement will operate in such cases to slightly unbalance hybrid ring 4 by an amount and in a direction to neutralize and substantially cancel out small leakage signals transmitted between the sending circuits and the receiving circuits through other circuit paths.

Next consider the case of a transmitted signal which is reflected back to antenna 5 by some object which is stationary relative to the antenna, such as a portion of the drone airplane in which the miss distance indicator is mounted. With respect to the hybrid ring circuit, the effect produced by this reflected signal is the same as that which would be produced by a small change in the antenna impedance. As has already been pointed out, the automatic balancing circuits operate to compensate automatically for changes in antenna impedance. Consequently, they will likewise operate to compensate for the reflected signal, and this reflected signal will be substantially neutralized and cancelled out. The signal reflected from missile 6 is not cancelled out for the following reason: missile 6 is in motion relative to antenna 5, and each time that the radial distance between the antenna and the missile changes by one-half wavelength, the effective change in antenna impedance produced by the signal reflected from the missile changes from an inductive reactance to a capacitive reactance and then back to an inductive reactance again. These changes occur at the Doppler signal frequency, generally between a few cycles per second and 600 cycles per second. The time constants of the automatic rebalancing circuits are such that they cannot follow changes this rapidly, and consequently signals reflected from objects moving relative to antenna 5 are not cancelled out. In the rebalancing circuits, resistors 111 and 122 may each have a resistance of about 1 megohm, while capacitors 64 and 66 each have a capacitance of about 12 microfarads. Consequently, the time constant of each rebalancing circuit is in the order of magnitude of 12 seconds.

Amplifier and recorder 14 makes a written record of the Doppler signal on a strip of chart paper. Curve 125 of Fig. 6 represents a typical Doppler signal record, made by apparatus similar to that illustrated in Fig. 1 in an actual test with a missile. In Fig. 6, horizontal distances from right to left represent successive time intervals, and vertical distances represent instantaneous Doppler signal amplitudes. At point 126 the missile is approaching the antenna, but is a considerable distance away. Consequently the Doppler signal has a small amplitude and a relatively high frequency. As the missile approaches the antenna, the amplitude of the Doppler signal increases and its frequency decreases. At point 127 the Doppler frequency is "zero," or more strictly, the Doppler phase is zero, which indicates that at point 127 the radial distance between the missile and the antenna is not changing. Consequently, it is known that point 127 represents the point of nearest approach of the missile to the antenna, from which miss distance should be calculated. The time at point 127 may be represented by $t_0$. As the missile proceeds away from the antenna, the Doppler signal decreases in amplitude and increases in frequency, as shown at 128.

Each cycle of the Doppler record indicates a change in the radial distance between the missile and the antenna equal to one-half wavelength of the transmitted radio wave. When the missile is relatively far away from the antenna, the radial velocity of the missile relative to the antenna is substantially equal to the total velocity of the missile relative to the antenna. To find this total velocity, which will be designated by the symbol V, two points 129 and 130 are selected arbitrarily near one end of the Doppler record. The time at these two points can be represented by $t_2$ and $t_3$, respectively. The time interval between points 129 and 130 can be determined by measuring the horizontal distance between these points on the chart, and comparing this with the known chart speed. This time interval can be designated $T_{2\,3}$. The number of Doppler cycles between points 129 and points 130 is counted and designated $N_{2\,3}$. The known wavelength of the transmitted radio wave is represented by $\lambda$. The total velocity of the missile relative to the antenna is then given by the following equation:

(Equation 7) $$V = \frac{N_{2\,3}\lambda}{2T_{2\,3}}$$

Next a point 131 is selected upon the Doppler record an arbitrary distance from point 127. The time at point 131 is represented by $t_1$. The time interval between points 127 and 131 can be determined by measuring the horizontal distance between these points on the chart, and this time interval may be designated $T_{01}$. The number of Doppler cycles between points 127 and 131 is counted and designated $N_{01}$.

Referring now to Fig. 7, the actual distance which the missile travels between times $t_0$ and $t_1$ is represented by a line 132 the length of which is proportional to the product of V and $T_{01}$. The miss distance is the same as the radial distance between the antenna and the missile at time $t_0$, identified by the symbol $D_0$ and represented in Fig. 7 by a line 133 drawn perpendicular to one end of line 132. Line 134, which forms the hypotenuse of the right triangle whose legs are lines 132 and 133, represents the radial distance $D_1$ between the missile and the antenna at time $t_1$. Since $T_{01}$ is known, and since the difference between $D_1$ and $D_0$ can be computed readily from the Doppler cycle count between points 127 and 131, the solution for the miss distance $D_0$ is now a matter of simple trigonometry. It can be shown that:

(Equation 8) $$D_0 = \frac{V^2 T_{01}^2}{N_{01}\lambda} - \frac{N_{01}\lambda}{4}$$

These computations can be made very quickly in the field to determine the miss distance $D_0$ with reasonable accuracy from any fairly good Doppler record provided by the miss distance indicator. Where greater accuracy is desired, or where serious noise and interference problems degrade the quality of the Doppler record, more elaborate analysis procedures may be employed, which, however, need not be explained for an understanding of the present invention.

Since hybrid ring 4 and loading and control circuits 21 can balance out small leakage signals through paths external to the hybrid ring, as hereinbefore explained, a similar arrangement can be used as a balancing circuit in other applications. For example, Fig. 8 illustrates a Doppler radar system having a radio transmitter 135 supplying electric signals to a transmitting antenna 136 through an antenna feeding circuit comprising inductor 137 and capacitor 138. Radio signals reflected from a missile 139, or other object, are received by a separate receiving antenna 140 coupled to receiver circuits 141 through a coupling transformer having a primary 142 and a secondary 143. Receiver circuits 141 may be similar to, or identical to, the receiver circuits shown in Fig. 3. To produce beat-frequency Doppler signals, an injection signal may be carried to the receiver circuit by lead 144 connected to a voltage divider comprising resistors 145 and 146 connected in series across the transmitter output terminals. In Doppler radar systems of this type, antennas 136 and 140 are usually highly directional, so that leakage signals between the sending and receiving circuits are relatively small. However, for high sensitivity of the radar system it is desirable that the leakage signal be reduced as much as is possible. For this purpose, hybrid ring 4 may be connected as a balancing circuit to transmit between transmitter and receiver circuits a leakage signal which balances other leakage signals transmitted between the two circuits by stray couplings and the like. In this case, the loading device connected to terminal 15 of the hybrid ring is not an antenna, but may be a fixed impedance consisting, for example, of a capacitor 147 in parallel with a resistor 148. Input terminal 3 of the hybrid ring is connected to the transmitter circuit by means of a coil 149 inductively coupled to inductor 137. A capacitor 150 may be connected in series with coil 149 to provide a low impedance series resonant circuit. The output terminal 9 of the hybrid ring is coupled to the receiver circuits by means of a coil 151 inductively coupled to transformer secondary 143. A capacitor 152 may be connected in parallel with coil 151 to provide a relatively high impedance parallel resonant circuit. Whenever the hybrid ring is unbalanced, a small leakage signal is transmitted from coil 149 in the transmitter circuit to coil 151 in the receiver circuit, and this leakage signal combines with any other leakage signals between the transmitter and receiver circuits to form a composite leakage signal. Since one portion of the leakage signal is varied in amplitude and phase by the cyclic variations in impedance of loading circuit 21, the composite leakage signal is amplitude modulated in such a way that the error signal obtained by demodulating the leakage signal controls the mean impedance value of the loading circuits to reduce the composite leakage signal, so that in effect, an automatic balancing circuit is provided which supplies a leakage signal to oppose and buck out other leakage signals transmitted through any other circuit paths.

It will be understood that this invention is not limited to specific embodiments herein illustrated and described, and that the following claims are intended to cover all changes and modifications which fall within the true spirit and scope of the invention.

What is claimed is:

1. Apparatus comprising two electric signalling circuits between which a leakage signal is transmitted, an adjustable balancing circuit to reduce said leakage signal, the amplitude of said leakage signal varying with the adjustment of said balancing circuit, a balance modulator cyclically varying the adjustment of said balancing circuit about a mean adjustment, whereby said leakage signal is amplitude modulated, and automatic rebalancing means responsive to such modulation of the leakage signal and controlling the mean adjustment of said balancing circuit.

2. Self-adjusting electrical balancing apparatus comprising input and output circuits, first and second parallel leakage circuits respectively transmitting first and second portions of a composite leakage signal between said input and output circuits, said first and second leakage circuits having different phase-shifting characteristics such that the two portions of a leakage signal which they transmit to the output circuit are substantially in phase opposition and tend to cancel each other, means connected with said second leakage circuit to control the amplitude of said composite leakage signal by altering said second portion responsive to changes in an adjustable control signal, a balance modulator supplying an alternating part of said control signal whereby said composite leakage signal is amplitude modulated, a detector to demodulate said composite leakage signal and provide an error signal having the same frequency as said alternating part of the control signal, and a phase comparator controlling a direct part of said control signal repsonsive to the amplitude and phase of said error signal.

3. Apparatus for simultaneously sending electric signals and receiving other electric signals, comprising a signal sending circuit, two circuit loading devices each having an electrical impedance, a ring circuit having four terminals connected by four circuit arms so that each of two opposite terminals is connected to each of the other two terminals, three of said circuit arms being transmission lines each substantially one-quarter of a wavelength long and one of said circuit arms being a transmission line substantially three-quarters of a wavelength long, said sending circuit and said receiving circuit being connected respectively to two opposite terminals of said ring circuit, said two loading devices being connected respectively to the other two terminals of said ring circuit, whereby the amplitude of a leakage signal between said sending circuit and said receiving circuit varies with relative changes in the impedance of said loading devices, a balance modulator cyclically varying the impedance of one of said loading devices about a mean impedance, whereby said leakage signal is amplitude modulated, and automatic rebalancing means responsive to such modulation of the leakage signal and controlling the mean impedance of one of said loading devices.

4. Apparatus for simultaneously sending electric signals and receiving other electric signals, comprising a signal sending circuit, a signal receiving circuit, two circuit loading devices each having first and second components of electrical impedance with phase angles differing by substantially 90°, a ring circuit having four terminals connected to four circuit arms so that each of two opposite terminals is connected to each of the other two terminals, three of said circuit arms having equal electrical lengths and the fourth of said circuit arms having an electrical length three times as large as any one of the other arms, said sending circuit and said receiving circuit being connected respectively to two opposite terminals of said ring circuit, said two loading devices being connected respectively to the other two terminals of said ring circuit, whereby the amplitude of a leakage signal between said sending circuit and said receiving circuit varies with changes in either impedance component of either of said two loading devices, a balance modulator cyclically varying the first impedance component of one of said loading devices about a first mean impedance and also cyclically varying the second impedance component of one of said loading devices about a second mean impedance, said two cyclic impedance variations being at the same frequency and in phase quadrature, whereby said leakage signal is amplitude modulated, a detector connected with said receiving circuit to demodulate said leakage signal and provide an error signal having first and second components in phase quadrature, a first phase comparator controlling said first mean impedance responsive only to said first component of the error signal, and a second phase comparator controlling said second mean impedance responsive only to said second component of the error signal.

5. Apparatus for simultaneously sending electric signals and receiving other electric signals, comprising a signal sending circuit, a signal receiving circuit, two circuit loading devices each having electrical resistance and reactance, the resistance of one of said loading devices being adjustable by a first control voltage applied to a resistance tube circuit, the reactance of one of said loading devices being adjustable by a second control voltage applied to a reactance tube circuit, a ring circuit having four terminals connected by four circuit arms so that each of two opposite terminals is connected to each of the other two terminals, three of said circuit arms having electrical lengths and a fourth of said circuit arms having an electrical length three times as large as any one of the other arms, said sending circuit and said receiving circuit being connected respectively to two opposite terminals of said ring circuit, said two loading devices being connected respectively to the other two terminals of said ring circuit, whereby the amplitude of a leakage signal between said sending circuit and said receiving circuit varies with changes in resistance and with changes in reactance of either of said loading devices, a balance modulator supplying an alternating part of said first control voltage and an alternating part of said second control voltage, the respective alternating parts of said two control voltages being of the same frequency and in phase quadrature, whereby said leakage signal is amplitude modulated, a detector connected with said receiving circuit to demodulate said leakage signal and provide an error signal having first and second components in phase quadrature, a first phase comparator responsive only to said first component of the error signal to adjust the value of a direct part of said first control voltage, and a second phase comparator responsive only to said second component of the error signal to adjust the value of a direct part of said second control voltage, so that said ring circuit is automatically and continuously rebalanced to reduce said leakage signal.

6. Apparatus for simultaneously sending electric signals and receiving other electric signals, comprising a signal sending circuit, a signal receiving circuit, first and second circuit loading devices each having electrical resistance and reactance, said second loading device including a resistance tube and a reactance tube connected to control its electrical resistance and reactance respectively, said resistance tube being a vacuum tube having a plate, a cathode, and a control grid connected with a feedback circuit which provides between the resistance tube's control grid and its cathode an alternating voltage in phase with an alternating voltage between its plate and its cathode, whereby said resistance tube has a resistive plate-to-cathode impedance which can be controlled by a first control voltage applied as a bias voltage between the resistance tube's control grid and cathode, said reactance tube being a vacuum tube having a plate, a cathode, and a control grid connected with a feedback circuit which provides between the reactance tube's control grid and its cathode an alternating voltage in phase quadrature with an alternating voltage between its plate and its cathode, whereby said reactance tube has a reactive plate-to-cathode impedance which can be controlled by a second control voltage applied as a bias voltage between the reactance tube's control grid and its cathode, a ring circuit having four terminals connected by four circuit arms so that each of two opposite terminals is connected to each of the other two terminals, three of said circuit arms having equal electrical lengths and the fourth of said circuit arms having an electrical length three times as large as any one of the other arms, said sending circuit and said receiving circuit being connected respectively to two opposite terminals of said ring circuit, said two loading devices being connected respectively to the other two terminals of said ring circuit, whereby the amplitude of the leakage signal between said sending circuit and said receiving circuit varies with changes in said first control voltage and also varies with changes in said second control voltage, a balance modulator supplying an alternating part of said first control voltage to the cathode of said resistance tube and supplying an alternating part of said second control voltage to the cathode of said reactance tube, the respective alternating parts of said two control voltages being of the same frequency and in phase quadrature, whereby said leakage signal is amplitude modulated, a detector connected with said receiving circuit to demodulate said leakage signal and provide an error signal having first and second components in phase quadrature, a first phase comparator responsive only to said first component of the error signal and supplying a direct part of said first control voltage to the control grid of said resistance tube so that the amplitude of said first component is reduced, and a second phase comparator responsive only to said second component of the error signal and supplying a direct part of said second control voltage to the control grid of said reactance tube so that the amplitude of said second component is reduced, whereby said ring circuit is automatically and continuously rebalanced to reduce said leakage signal.

7. Doppler radar apparatus comprising a radio transmitter, a radio receiver, an adjustable balancing circuit to reduce a leakage signal between said transmitter and said receiver, the amplitude of said leakage signal varying with the adjustment of said balancing circuit, a balance modulator cyclically varying the adjustment of said balancing circuit about a mean adjustment, whereby said leakage signal is amplitude modulated, automatic rebalancing means responsive to such modulation of the leakage signal and controlling the mean adjustment of said balancing circuit to reduce said leakage signal, means carrying an injection signal from said transmitter to said receiver, and means associated with said receiver to mix said injection signal with received radio signals to produce a beat-frequency Doppler signal.

8. Doppler radar apparatus comprising a radio transmitter, a radio receiving circuit, an adjustable balancing circuit to reduce a leakage signal between said transmitter and said receiving circuit, the amplitude of said leakage signal varying with the adjustment of said balancing circuit, a balance modulator cyclically varying the adjustment of said balancing circuit about a mean adjustment, whereby said leakage signal is amplitude modulated, a detector connected with said receiving circuit to demodulate said leakage signal and provide an alternating error signal, phase comparator means responsive to the error signal and controlling the mean adjustment of said balancing circuit to reduce said leakage signal, means connected with said receiving circuit to mix received signals with a signal injected from said transmitter, and another detector connected to demodulate said mixed signals and provide a beat-frequency Doppler signal.

9. Doppler radar apparatus comprising a radio transmitter, a radio receiver, an adjustable balancing circuit to reduce a leakage signal between said transmitter and said receiver, the amplitude of said leakage signal varying with the adjustment of said balancing circuit, a balance modulator cyclically varying the adjustment of said balancing circuit about a mean adjustment, whereby said leakage signal is amplitude modulated, said receiver having first and second radio frequency amplifier stages connected in tandem, a detector connected to demodulate an output signal from said first amplifier stage to provide a balancing circuit error signal, phase comparator means responsive to said error signal and controlling the means adjustment of said balancing circuit to reduce said leakage signal, means carrying an injection signal with an output signal from said second amplifier stage, and another detector connected to demodulate said mixed signal and provide a beat-frequency Doppler signal.

10. Apparatus for simultaneously sending electric signals and receiving other electric signals, comprising signal sending apparatus, signal receiving apparatus, a two-way signalling circuit, a loading device having an adjustable impedance, a ring circuit having four terminals connected by four circuit arms so that each of two opposite terminals is connected to each of the other two terminals, three of said circuit arms having equal electrical length, and the fourth of said circuit arms having an electrical length three times as large as any one of the other arms, said sending apparatus and said receiving apparatus being connected respectively to two opposite terminals of said ring circuit, said two-way circuit and said loading device being connected respectively to each of the other two terminals of said ring circuit, the amplitude of a leakage signal between said sending apparatus and said receiving apparatus being smallest at a best impedance adjustment of said loading device and increasing with a departure in either direction from said best impedance adjustment, a balance modulator cyclically varying the impedance of said loading device about a mean impedance, whereby said leakage signal is amplitude modulated, a detector to demodulate said leakage signal and provide an error signal having an amplitude related to the amount and a phase related to the direction of said departure from the best impedance adjustment, and a phase comparator responsive to said error signal and controlling a mean impedance of said loading device to reduce said departure.

11. A diplexer for transmitting electric signals from a sending circuit to a two-way circuit and transmitting other electric signals from said two-way circuit to a receiving circuit, comprising a loading device having an electrical impedance substantially equal to that of said two-way circuit, a ring circuit having first, second, third, and fourth terminals, said ring circuit having four circuit arms connecting said first and second, second and third, third and fourth, and fourth and first terminals respectively, three of said circuit arms being transmission lines each substantially one-quarter of a wavelength long and one of said circuit arms being a transmission line substantially three-quarters of a wavelength long, said sending circuit being connected to said first terminal, said two-way circuit being connected to said second terminal, said receiving circuit being connected to said third terminal, and said loading device being connected to said fourth terminal, and means for cyclically varying the impedance of said loading device to modulate a leakage signal between said sending circuit and said receiving circuit.

12. A Doppler radar comprising a continuous wave radio transmitter, a radio receiver, a common receiving and sending antenna, a circuit loading device having adjustable electrical resistance and reactance, a hybrid ring having four terminals connected by four circuit arms in a closed loop so that each of two opposite terminals is connected to each of the other two terminals, three of said circuit arms having equal electrical lengths and a fourth of said circuit arms having an electrical length three times as large as any one of the other arms, said transmitter and said receiver being connected respectively to two opposite terminals of said hybrid ring, said antenna and said loading device being connected respectively to the other two terminals of said hybrid ring, whereby the amplitude of a leakage signal between said transmitter and said receiver varies with changes in the resistance of said loading device and also varies with changes in the reactance of said loading device, said loading device including a resistance tube and a reactance tube so arranged that a first adjustable control voltage controls the resistance of said loading device and a second adjustable control voltage controls the reactance of said loading device, a balance modulator supplying an alternating part of said first control voltage and an alternating part of said second control voltage, said alternating parts of the two control voltages having the same frequency and being in phase quadrature, whereby said leakage signal is amplitude modulated, a detector arranged to demodulate said leakage signal and provide two error signal components in phase quadrature each having the same frequency as said alternating parts of the control voltages, a first phase comparator responsive only to one of said error signal components and controlling a direct part of said first control voltage, and a second phase comparator responsive only to the other of said error signal components and controlling a direct part of said second control voltage.

13. Apparatus for substantially balancing out leakage signals between a radio transmitting antenna and a radio receiving antenna, comprising a sending circuit connected to said transmitting antenna, a receiving circuit connected to said receiving antenna, first and second circuit loading devices having substantially equal electrical impedances, the impedance of said second loading device being adjustable, a ring circuit having four terminals connected by four circuit arms so that each of two opposite terminals is connected to each of two intermediate terminals, three of said circuit arms having equal electrical lengths and the fourth of said circuit arms having an electrical length three times as large as any one of the other arms, means carrying electric signals from said sending circuit to one of said two opposite terminals, means carrying electric signals from the other of said two opposite terminals to said receiving circuit, said two loading devices being connected respectively to said two intermediate terminals, the amplitude of the leakage signal between said sending circuit and said receiving circuit being smallest at a best impedance adjustment of said second loading device and increasing with a departure in either direction from said best impedance adjustment, a balance modulator cyclically varying the impedance of said second loading device about a mean impedance, whereby said leakage signal is amplitude modulated, a detector to demodulate said leakage signal and provide an error signal having an amplitude related to the amount and a phase related to the direction of said departure from the best impedance adjustment, and a phase comparator responsive to said error signal and controlling the mean impedance of said second loading device to reduce said departure.

14. A miss distance indicator for measuring the miss distance between a missile and a target, comprising a continuous wave radio transmitter, a radio receiver, a common sending and receiving antenna mounted on said target so that radio waves transmitted by said antenna and reflected from said missile are received by said antenna with a Doppler shift in frequency of the received wave corresponding to the radial velocity of the missile relative to the target, a circuit loading device having adjustable electrical resistance and reactance, a hybrid ring having four terminals connected by four circuit arms in a closed loop so that each of two opposite terminals is connected to each of the other two terminals, three of said circuit arms being coaxial transmission lines substantially one-quarter of a wavelength long and the fourth of said circuit arms being a coaxial transmission line substantially three-quarters of a wavelength long, said transmitter and said receiver being connected respectively to two opposite terminals of said hybrid ring, said antenna and said loading device being connected respectively to the other two terminals of said hybrid ring, whereby the amplitude of a leakage signal between said transmitter and said receiver is substantially zero at a combination of best resistance adjustment and best reactance adjustment of said loading device and increases with a departure of either adjustment in either direction from said best adjustments, means cyclically varying said resistance adjustment about a mean resistance adjustment and cyclically varying said reactance adjustment about a mean reactance adjustment, the resistance variations being in phase quadrature to the reactance variations, whereby said leakage signal is amplitude modulated with first and second modulation components in phase quadrature, automatic rebalancing means responsive to said first modulation component and controlling said mean resistance adjustment to reduce said first modulation component, automatic rebalancing means responsive to said second modulation component and controlling said mean reactance adjustment to reduce said second modulation component, means carrying an injection signal from said transmitter to said receiver, said injection signal acting with received signals to provide a beat frequency Doppler signal, and means recording said Doppler signal on a chart so that it may be used to calculate miss distances.

15. Apparatus for simultaneously sending electric signals and receiving electric signals, comprising a signal sending circuit, a signal receiving circuit, two circuit loading devices each having an electrical impedance, a ring circuit having four terminals connected by four circuit arms so that each of two opposite terminals is connected to each of the other two terminals, said sending circuit and said receiving circuit being connected respectively to two opposite terminals of said ring circuit, said two loading devices being connected respectively to the other two terminals of said ring circuit, means for cyclically varying the impedance of at least one of said loading devices to modulate a leakage signal between said sending circuit and said receiving circuit, and means responsive to said modulated leakage signal for automatically adjusting the mean impedance of at least one of said loading devices to minimize said leakage signal.

16. Apparatus as in claim 15, in which said four circuit arms have respective electrical lengths, expressed in degrees of phase shift, so related to one another that the product of the sines of said four electrical lengths has a negative value.

17. Apparatus as in claim 15, in which three of said circuit arms each have electrical lengths smaller than one-half wavelength and a fourth of said circuit arms has an electrical length larger than one-half wavelength and smaller than one wavelength.

18. Apparatus for simultaneously sending electric signals and receiving electric signals, comprising a signal sending circuit, a signal receiving circuit, two circuit loading devices each having first and second components of electrical impedance, a ring circuit having four terminals connected to four circuit arms so that each of two opposite terminals is connected to each of the other two terminals, said sending circuit and said receiving circuit being connected respectively to said two opposite terminals, said two loading devices being connected respectively to said other two terminals, whereby the amplitude of a leakage signal between said sending circuit and said receiving circuit varies with changes in either impedance component of either of said two loading devices, means cyclically varying the first impedance component of one of said loading devices about a first mean impedance to amplitude modulate said leakage signal with a first modulation component, means cyclically varying the second impedance component of one of said loading devices about a second mean impedance to amplitude modulate said leakage signal with a second modulation component, means controlling the value of said first mean impedance responsive to values of said first modulation component, and means controlling the value of said second mean impedance responsive to values of said second modulation component.

19. A diplexer for transmitting electric signals from a sending circuit to a two-way circuit and transmitting electric signals from said two-way circuit to a receiving circuit, comprising a loading device, a ring circuit having first, second, third and fourth terminals, said ring circuit being composed of four transmission lines connecting said first and second, second and third, third and fourth, and fourth and first terminals respectively, said sending circuit being connected to said first terminal, said two-way circuit being connected to said second terminal, said receiving circuit being connected to said third terminal, and said loading device being connected to said fourth terminal, means cyclically varying the impedance of said loading device about a mean impedance value to modulate a leakage signal between said sending circuit and said receiving circuit, and means responsive to the modulated leakage signal for automatically adjusting said mean impedance value to reduce said leakage signal.

20. A diplexer as in claim 19, in which said four transmission lines have respective electrical lengths, expressed in degrees of phase shift, so related to one another that the product of the sines of said four electrical lengths has a negative value.

21. A diplexer as in claim 19, in which three of said transmission lines each have electrical lengths smaller than one-half wavelength and a fourth of said transmission lines has an electrical length larger than one-half wavelength and smaller than one wavelength.

References Cited in the file of this patent

UNITED STATES PATENTS

| | | |
|---|---|---|
| 2,397,645 | Brown | Apr. 2, 1946 |
| 2,666,132 | Barrow | Jan. 12, 1954 |